United States Patent
Kaplan

(10) Patent No.: US 8,258,644 B2
(45) Date of Patent: Sep. 4, 2012

(54) APPARATUS FOR HARVESTING ENERGY FROM FLOW-INDUCED OSCILLATIONS AND METHOD FOR THE SAME

(76) Inventor: A. Morris Kaplan, Rockville, MD (US)

( * ) Notice: Subject to any disclaimer, the term of this patent is extended or adjusted under 35 U.S.C. 154(b) by 358 days.

(21) Appl. No.: 12/577,393

(22) Filed: Oct. 12, 2009

(65) Prior Publication Data
US 2011/0084489 A1    Apr. 14, 2011

(51) Int. Cl.
F03D 5/00 (2006.01)
H02K 35/00 (2006.01)

(52) U.S. Cl. ......................................................... 290/54
(58) Field of Classification Search ................... 290/54, 290/55
See application file for complete search history.

(56) References Cited

U.S. PATENT DOCUMENTS

| | | | | |
|---|---|---|---|---|
| 4,627,294 A * | 12/1986 | Lew | ............................ | 73/861.05 |
| 5,751,091 A | 5/1998 | Takahashi et al. | | |
| 5,801,475 A | 9/1998 | Kimura | | |
| 5,839,508 A * | 11/1998 | Tubel et al. | ................... | 166/65.1 |
| 6,041,022 A | 3/2000 | Tu et al. | | |
| 6,351,999 B1 * | 3/2002 | Maul et al. | ................. | 73/861.22 |
| 6,504,258 B2 * | 1/2003 | Schultz et al. | ................ | 290/1 R |
| 6,958,553 B2 * | 10/2005 | Ichii et al. | ........................ | 310/15 |
| 7,078,832 B2 * | 7/2006 | Inagaki et al. | ............. | 310/12.19 |
| 7,199,480 B2 | 4/2007 | Fripp et al. | | |
| 7,208,845 B2 | 4/2007 | Masters et al. | | |
| 7,224,077 B2 * | 5/2007 | Allen | ............................. | 290/1 R |
| 7,498,681 B1 * | 3/2009 | Kellogg et al. | ............... | 290/1 R |
| 7,498,682 B2 | 3/2009 | Lemieux | | |
| 7,504,764 B2 | 3/2009 | Chang et al. | | |
| 7,525,205 B2 * | 4/2009 | Mabuchi et al. | ............... | 290/1 R |
| 7,560,856 B2 * | 7/2009 | Chen et al. | ..................... | 310/339 |
| 7,573,143 B2 * | 8/2009 | Frayne | ........................... | 290/1 R |
| 7,633,175 B1 * | 12/2009 | Wilson et al. | .................... | 290/43 |
| 7,772,712 B2 * | 8/2010 | Frayne | .......................... | 290/1 R |
| 7,812,466 B2 * | 10/2010 | Lu et al. | ......................... | 290/1 R |
| 7,868,475 B1 * | 1/2011 | Bradford et al. | ............. | 290/1 R |
| 7,884,490 B1 * | 2/2011 | Wilson et al. | .................... | 290/43 |
| 7,906,861 B2 * | 3/2011 | Guerrero et al. | ............. | 290/1 R |

(Continued)

FOREIGN PATENT DOCUMENTS

JP           2001157433        6/2001

(Continued)

OTHER PUBLICATIONS

International Search Report dated Jun. 13, 2011, received in PCT/US2010/052191.

(Continued)

*Primary Examiner* — Joseph Waks
(74) *Attorney, Agent, or Firm* — Nadya Reingand

(57) ABSTRACT

A device and method for harvesting electrical power from kinetic energy of a flow. The electricity generator includes a vibration assembly and magnetic field source. The external gas or liquid flow causes a vibration of the assembly with an integrated conductive element, producing electricity in proximity of a magnetic field. The vibrating assembly has a set of resonant frequencies that correspond to a set of the frequencies of the flow vortices within a predetermined range of the external flow velocities. An arbitrary number of adjustable generators can be connected into a single circuit, either in-series or in-parallel, to increase an overall power output. It is capable to operate under wide range of flow characteristics and can serve as a virtually maintenance-free source of electrical power.

20 Claims, 8 Drawing Sheets a.

b.

U.S. PATENT DOCUMENTS

| | | | |
|---|---|---|---|
| 2005/0051323 A1 * | 3/2005 | Fripp et al. | 166/65.1 |
| 2008/0129254 A1 | 6/2008 | Frayne | |
| 2008/0297119 A1 | 12/2008 | Frayne | |
| 2009/0097981 A1 | 4/2009 | Gabrys | |
| 2009/0169354 A1 | 7/2009 | Kelaiditis et al. | |

FOREIGN PATENT DOCUMENTS

| | | | |
|---|---|---|---|
| JP | 2001157433 A * | 6/2001 | |
| JP | 2003116258 | 4/2003 | |
| JP | 2003116258 A * | 4/2003 | |
| JP | 2006291842 | 10/2006 | |
| JP | 2006291842 A * | 10/2006 | |
| WO | WO 2006109362 A1 * | 10/2006 | |

OTHER PUBLICATIONS

Landau, L. D. and Lifshitz, E.M. "Fluid Mechanics", 2nd Ed.: vol. 6 (Course of Theoretical Physics), Pergamon Press (1987), pp. 134-135.

* cited by examiner

Conductive element displacement: from the viewer

Conductive element displacement: towards the viewer

Conductive element displacement: from the viewer

Conductive element displacement: towards the viewer

APPARATUS FOR HARVESTING ENERGY FROM FLOW-INDUCED OSCILLATIONS AND METHOD FOR THE SAME

FIELD OF INVENTION

This invention relates to electricity generation from the oscillations of an arbitrary structure in the presence of a flow of different types.

BACKGROUND OF THE INVENTION

The invention is related to conversion of kinetic energy, which is present in various flows, such as airflows, water flows, tides, etc., into electricity. This disclosure describes various embodiments of a novel energy converter that efficiently utilizes oscillations induced by different types of a flow, in order to generate electricity or other types of energy.

The flow energy of water or wind has been utilized by mankind for centuries. The kinetic energy of the flow can be converted into rotating or oscillating movements of the affected device, where energy can further be harvested by different means.

Modern wind-powered and hydro-powered generators that based on propeller, rotor, turbine or rotating airfoil became reliable and widespread energy sources and their implementations are growing due to its economical power production and environmental benefits.

Large wind turbines, which typically located off shore or at remote areas, have increasingly being installed worldwide, providing megawatts of electric power without polluting the environment. Although the turbine-based wind generators are, in general, effective in certain conditions, they have limitations resulting from typical requirements of large open spaces (consistently high-speed winds), infrastructure development and large initial capital costs.

One if the main disadvantages of turbine-based wind generators is a limited efficiency at wide range of flow velocities, specifically, low cost-effectiveness at regimes with a lower power output and lack of the efficient adjustment to flow velocity changes.

Another frequent objection to large wind turbines is that they take a lot of space and often considered to be an eyesore.

Alternatively, small wind generators can be located at urban and suburban rooftops, in yards and along roadsides. Potentially, they could minimize electricity transmission losses and the need for additional transmission lines. However, the use of small wind generators (typically less that 10 kilowatts peak power) has generally been limited. The small wind generators currently suffer from substantial drawbacks that prevent their widespread adoption. Such limitations are the cost per produced energy, low energy capture, conversion and efficiency. In addition, most small wind turbines require a proper zoning and installations. Towers might also interfere with aviation and/or being visually obtrusive. Other disadvantages include noisy operation, rotor turbulence sensitivity and possible over-speed failures.

The alternative designs for generators that utilize kinetic energy of the flow have also been suggested. Thus, some attempts have been made to overcome the drawbacks of the common turbine-based devices and address the 'efficiency versus footprint' problem. Propeller-free designs, capable of operating in various environments, have been reported in U.S. Patent Application #20090097981 by C. W. Gabrys, and in US Patent Application #20090169354 by K. Kelaiditis et al.

The random motion (or random displacement) can also be considered as a source of kinetic energy. Accordingly, various electro-mechanical converters, (linear generators, for examples) and electrical schemes have been proposed for conversion of a mechanical power into electricity, for example, using the vibration energy to charge batteries. For example, U.S. Pat. No. 7,498,682 by A. P. Lemieux, describes the linear generator based on electro-magnetic solenoid, while the U.S. Pat. No. 7,504,764 by Y. S. Chang et al. discloses device for harvesting power from environmentally induced vibrations using a matrix of piezo-elements.

It should be noted, that mechanical-electrical converters, either based on solenoid- or piezo-transducers, have been significantly perfected by a watch-making industry, see, for example, U.S. Pat. No. 6,041,022 by M. X. Tu et al. and U.S. Pat. No. 5,751,091 by O. Takahashi et al.,—timepiece designs by Patek Philippe and Seiko, respectively.

While such generators can provide sufficient energy for small applications, they are not optimized for efficient conversion of energy available in various flows of gases or fluids.

Similarly to vibration-based electro-mechanical converters, another approach utilizes oscillations induced by a flow of gas or fluids to generate electricity, see US Patent Application #20080297119 and #20080129254, both by S. M. Frayne. This disclosure based on exploiting a wind flow to generate energy by using an aero-elastic flutter effect induced along at least one tensioned flexible membrane (ribbon, or 'belt') fixed at two or more points. Either magnetic filed generator or conductor is attached to the ribbon at certain fixed points only. The respective electro-magnetic elements are disposed at fixed points on the supporting structure, which is build around the ribbon. Implementing of such flexible membranes also requires maintaining a constant tension, which arises from a natural elasticity of the membrane, changing over longer periods of time. Feedback systems (constant-force springs or membrane anchors) were proposed to be built into the generator to alter the membrane tension in response to the flow speeds detected by an auxiliary sensor. The invention also suggests using magnetic field generator and an adjustable tension device, configured to apply an adjustable tension force between the fixed ends of the "belt" accordingly to the fluid flow velocity.

Another approach disclosed in U.S. Pat. No. 7,208,845, by B. Masters et al. and also in U.S. Pat. No. 7,199,480, by M. L. Fripp, describes an elongated arm, having a vortex shedding device at one end and an electrical power generator at an opposite end of the arm, for electrical power generations in fluid transmitting pipes (tubular strings), such as oil or water pipes. In such disclosure an elastic support keeps the arm against alternating lift-forces produced by vortices that shed by the vortex shedding device. A vortex-shedding device sheds vortices in response to fluid flow across the vibrating assembly at a frequency that is substantially equal to a resonant frequency of the vibrating assembly. A generator on the opposite side of an elongated arm generates electrical power in response to vibration of the vibrating assembly.

The previous designs required incorporation of weights in forms of coils or magnets and vortex shading devices being designed to move a substantial mass with some displacements at certain frequency. This mass needs a special vibration assembly and, in some cases, a source of instability at the oscillation onset. It limits the span of possible oscillation frequencies and/or may damp down the desired oscillation frequencies for certain flow characteristics. Moreover, in all proposed generators the weight of the vibrating element restricts the allowed transducer geometry, resulting in a limited range of oscillating frequencies needed for efficient energy conversion. Accordingly, previously disclosed vibration-based power generators are not optimized to couple the available energy of the various flows into the vibration assembly, which limits the conversion efficiency.

Furthermore, all mentioned proposals for small wind/hydro generators are not always satisfactory due to the design complexities, manufacturing cost, need for a complex mounting/control structures, high maintenance cost and low efficiency in energy production at various flow velocities. In particular, the use of mentioned flexible ribbon (membrane that fixed at two or more points) is prone to insufficient power generation due to limited production of vibrations under various conditions, restriction to high flow speeds, temperature and humidity changes, requirements for real-time adjustments, etc.

Vibration-based electro-mechanical converters are facing another problem of efficient rectifying of the generated alternating current (AC). Different attempts have been made to optimize the energy extraction from the generators by improving the rectifying electrical circuit, see for example, the U.S. Pat. No. 5,801,475 by M. Kimura for a piezo-transducer, where the storage capacitor is utilized.

There is a strong demand for a new type of low-cost/low-maintenance power generators that are capable of efficient conversion of the flow kinetic energy into electricity under various conditions, such as the flow velocities, temperature/humidity variations, etc. New, commercially feasible, small foot-print, scalable solutions are needed to overcome the previous rationales that restrained the non-turbine electrical generators from earlier implementation.

It is desirable to create such improved vibration-based power generator where the total area of the (virtually weightless) generating element is fully integrated into the oscillating assembly. In the present disclosure it is suggested not to separate the oscillating and generating elements. Accordingly, the oscillating element and generating element are monolithically integrated together, to perform as a single unit, which eliminates the need for the intermediate stages, such as pivots, arms, membranes, levers, etc. By this means, the oscillation energy is concentrated right at the location of the conducting element resulting in a higher efficiency of energy conversion. In addition, it provides an efficient conversion under wider range of frequencies, i.e. flow speed range.

The invention disclosed herein does not require an attached mass to provide a desired oscillation of the vibrating element. It also does not require any rotating, friction, grinding parts or flexible membranes to prove a quiet, virtually maintenance-free, operation.

Proposed new type of the energy converters can be manufactured using MEMS technology, also enabling the "generators on a chip" concept. The small generating cells, based on the disclosure, can become the building blocks for various generators of different scales, including very small generators or large energy-harvesting panels. In the future, flexible configurations that use multiple generating cells joined into customized structures of arbitrary shape, can become indispensable power supply for any micro- and macro-environments, where the natural or artificial flow is available.

SUMMARY OF THE INVENTION

A device and method for generating electrical power from various types of flow, such as gas or liquid, is disclosed. The device is based on a generating cell or its combinations. The generating cell includes at least one electrical conductive element monolithically integrated with the elastic element affixed to the supporting structure by a single end. It also includes a magnetic field source configured to apply a magnetic field to the conductive element where the conductive element is essentially perpendicular to the magnetic field.

The external flow causes a vibration of the elastic element with integrated conductive element, producing electricity in the proximity of the magnetic field. The elastic element can be made of various materials, have various shapes and can be positioned at various angles relatively to the flow direction. The conductive element may be a combination of multiple electrical conductors having various shapes and made of various materials. The magnetic field source can be a permanent magnet or electrical solenoid. An electrical circuit is provided to extract and rectify the generated electrical current.

An arbitrary number of electricity generating cells can be connected into a single circuit, either in-series or in-parallel, to increase an overall power output. Such combinations can be manufactured using MEMS technology, with series of cells being micro-fabricated by a batch-fabrication or micro-machining, including integration of the rectifying circuitry and magnetic field sources into the same wafer. The future 'generators-on-chip' and 'generating-panels' concepts can be developed by this technology. The generating panels may include more than one layer of various generating cells. This can benefit the total generator output by harvesting energy flow at different locations of the flow stream.

The vibrating assembly, which includes both the elastic and the conductive elements, has a set of vibration modes (resonant frequencies) that are, essentially, equal to a set of the frequencies of the flow vortices, within a predetermined range of the flow velocities. Accordingly, the elastic element has pre-defined characteristics to achieve the resonant vibration modes corresponding to the set of frequencies of vortices in the flow.

In one embodiment of the disclosure, the device includes flow-controlling elements to adjust the flow velocity and its direction in proximity of the vibrating assembly. In another embodiment of the device, the vibration assembly itself or the flow-controlling elements are adjustable to provide maximum conversion efficiency under different flow characteristics, environmental conditions or a desired electrical output.

The electricity, generated by the disclosed device, can be used for flow-energy harvesting within the confined flow passages in water-pipes, oil-pipes or HVAC ducts, as an example. It can provide a power supply to various wireless sensors, distributed sensor arrays or LED-based lighting. The generated electricity can also be used for powering cell phones as well as remote telecommunication nodes or wireless data transmission network nodes, such as WiFi, or meshed network. The device can perform as both a flow sensor and the power source needed for transmitting this obtained sensor information. Alternatively, it can be used in flying devices and vehicles. The draughts and airflows present at higher altitudes can be captured. The same is applicable for underwater currents and submarine vessels.

For example, hundreds or thousands of small generating cells, implemented as roof panels, can become a virtually maintenance-free source of electrical power, making it a much better alternative to expensive solar panels. Unlike the previously reported power generators, the disclosure is capable to operate under wide range of the flow condition. It is capable to operate both at low and very high flow velocities, without any additional damage-preventive equipment. The disclosure does not include any massive elements which can be dangerous when detached if the device fails under extreme conditions. The disclosure does not require any rotating, fric-

DETAILED DESCRIPTION OF THE INVENTION

Figure 1:
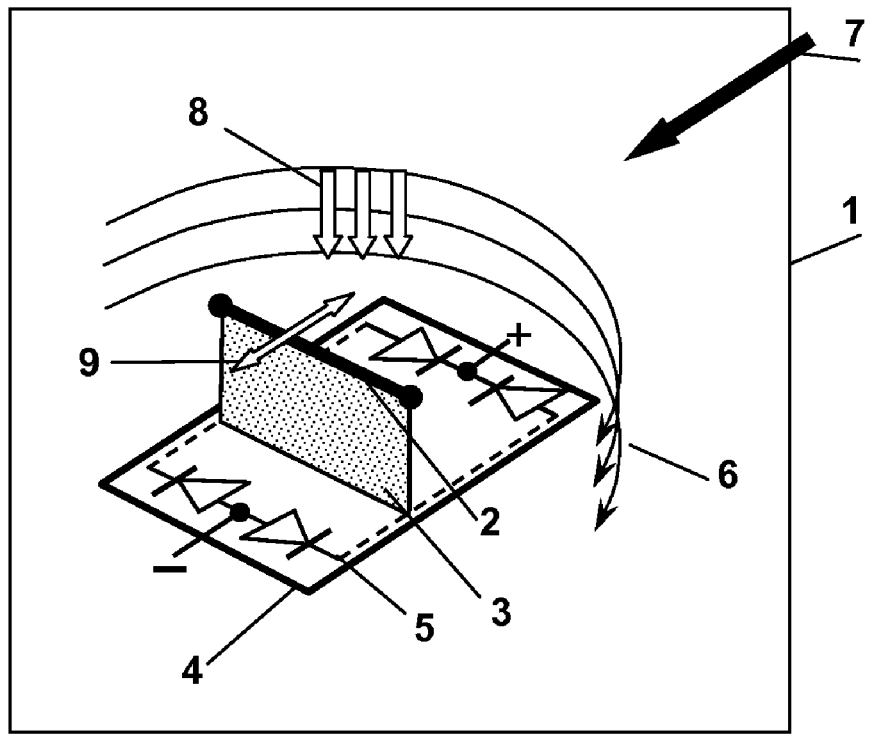
FIG. 1(a-b). The two exemplary conceptual configurations of a single generating cell. The vibrating assembly is substantially perpendicular to the flow direction,—(a). The vibrating assembly is substantially parallel to the flow direction,—(b).
Figure 1:
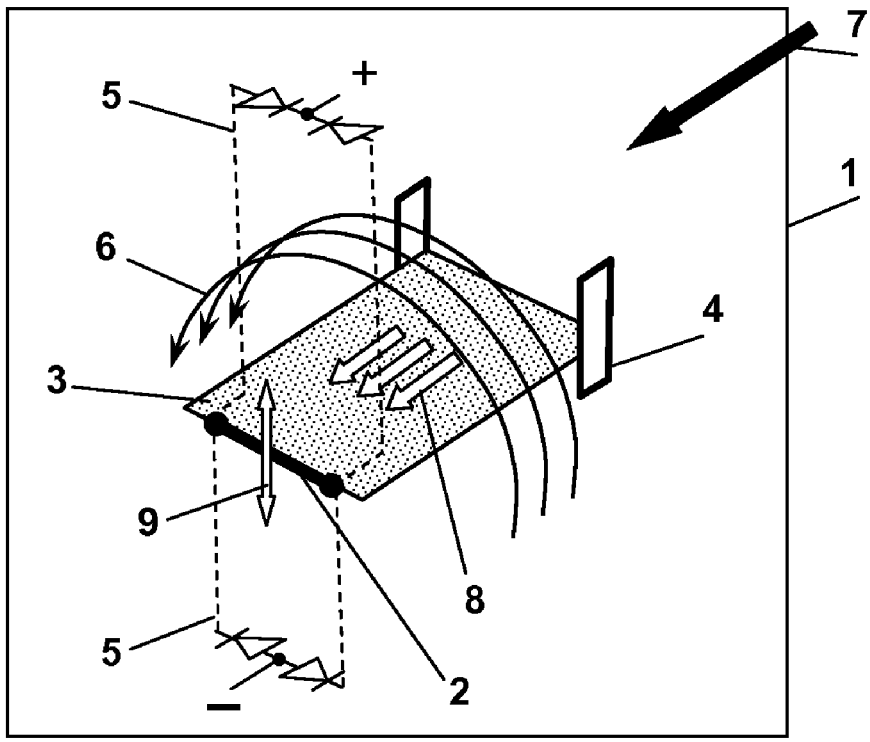

An electrical generator includes at least one electrical conductive element and at least one magnetic field source in the presence of the external flow. The conductive element is monolithically integrated with an elastic element and configured to move with the elastic element. The elastic element is attached to the base at least at one point. When the flow does not impinge on the elastic element, the elastic element and the conductive element are maintained in a neutral position at the base. The flow impinges on the elastic element causing a displacement of the elastic element with integrated conductive element, producing electricity in the proximity of the magnetic field.

The preferred embodiment of the generator is described below, but it should be clearly understood that the principles of the invention are not limited to any particular embodiment of generator described herein. It will be apparent to one skilled in the art that the present disclosure may be practiced without the specific details.

The term "flow", as used herein is defined as one or more gases (such as an air, natural gas, etc.), liquids (such as oil, water, etc.), one or more solids (such as sand, mud, etc.) or any combination of above.

The term "conductive element", as used herein is defined as an electrical conductor that can be implemented either as a single piece or as a combination of multiple conductors; made of using various electrical conducting materials of various geometries. The conductive element is preferably monolithically integrated with the elastic element.

The term "elastic element", as used herein, is defined as a springy element with elastic properties that can be made of different materials and have different geometrical shapes and sizes. The elastic element is designed to produce partially-induced auto-oscillations in the flow of gas or liquid and its characteristics are optimized in terms of a response to the applied force of the external flow. The elastic element is integrated with the conductive element.

The term "base", as used herein, is defined as any structure that has sufficient strength to support at least one affixed elastic element. The supporting structure can be made of any material, having various shapes and sizes.

The term "magnetic field source", as used herein, is defined as a permanent magnet or electrical magnet (solenoid) made of a single or multiple elements (magnets), and/or a single coil or a plurality of coils, of the same or different shapes, materials or sizes.

The monolithically integrated conductive and elastic elements, in combination with magnetic field created by magnetic field source, define a unit, which forms a single generating cell of the generator.

The combination of the conductive element, integrated with the elastic element, which is attached to the base, defines a vibrating assembly of the cell. By choosing appropriate materials and geometries of the vibrating assembly, the vibration modes of the assembly can be optimized resulting in a higher conversion efficiency of the disclosed generating cell.

The term "vibration mode", as used herein, is defined as a normal (or resonant) mode of the vibrating assembly. The frequencies of the normal modes of the assembly are defined as its natural (intrinsic or resonant) frequencies. Normal mode of the vibrating assembly is a pattern of its motion. Any vibrating assembly has a set of normal modes (and corresponding frequencies) that depend on its structure and composition. The most general vibrating motion of the assembly is a superposition of its normal modes, where each of the modes is a single frequency solution of the motion equations. The modes are normal in the sense that they can move independently, and an excitation of any single mode does not affect the motion of another mode.

While such terms as conductive element, elastic element and magnetic field source are used separately in the forthcoming disclosure, it should be clearly understood that the all three mentioned elements represent a single unit and are, preferably, integrated together.

The preferable embodiment of the disclosure cell is shown schematically in the FIG. 1a and FIG. 1b for the two exemplary configurations of the generating cell. The disclosed cell 1 includes the elastic element 3 that supports the conductive element 2. The elastic element 3 connected to the base (supporting structure) 4 at least by a single end. FIG. 1a illustrates the exemplary case when the elastic element 3 is substantially perpendicular to the flow direction 7, while FIG. 1b illustrates the exemplary case when the elastic element it substantially parallel to the flow direction 7. For both cases, the arrangement of the magnetic field source 6 provides a magnetic field 8 which is substantially perpendicular to the conductive element 2. Such configurations are optimized for converting the flow energy into vibrating energy by exploiting a vortices shedding effect and/or a flutter effect induced along the elastic element.

In a general embodiment of the disclosure, the elastic element 3 may be positioned at angle (inclined) relatively to the flow 7. The value of this angle between the elastic element and the flow is conditioned by the maximum conversion efficiency.

An electrical circuit 5 is provided to condition the electrical current generation, rectification and extraction from the conductive element 2. The magnetic field 8 is generated by at least one magnetic field source 6. Magnetic field source 6 can be either an electrical solenoid or a permanent magnet. The flow perturbation is applied to the elastic element 3 is a function of the characteristics of the flow 7 and physical characteristics of the elastic element 3, such as elastic properties, geometry, size, etc.

In the following description, the various embodiments of the generating cell described herein may be utilized in various components orientations, such as inclined, inverted, horizontal, vertical, etc., and in various configurations, without departing from the principles of the present invention.

With the reference to FIG. 1a and FIG. 1b, the operation of the cell 1 can be summarized as follows.

The flow 7 initiates a self-exciting (spontaneous) instability in the vibrating assembly involving a combination of vortices shedding and, in some cases, elastic flutter. This self-excitation is enhanced by a positive feedback loop of continuous flow deflection by the vibrating assembly as well as elastic force that depend on deformations of the elastic element 3. Self-excitations of the elastic element, combined with rigidly affixed conductive element (monolithically integrated with the elastic element), are enhanced by a positive feedback loop until an approximately constant oscillation state of the elastic element with affixed conductive element is achieved.

A flow 7 can be of any type, such as liquid or gas (for example, an air in natural wind or artificial ventilation systems), travels across the elastic element 3. In general embodiment of the disclosure, flow may come from either side of the generating cell.

The flow 7 is responsible for starting the vibration of the vibration assembly in direction 9. The vibration (oscillation) of the vibration assembly caused by the flow 7 results in the displacement of the conducting element 2, relatively to the applied magnetic field 8 that created by the magnetic field source 6. Such displacement induces an electrical current propagating within the conducting element 2. The oscillations take place along the direction 9 and across the transversal magnetic field 8, by these means inducing an alternating potential at the ends of the conductive element 2.

When the flow 7 does not impinge on the vibrating assembly, the vibrating assembly is maintained in a neutral position by the elastic force of the elastic element 3. The elastic element 3 is biased toward its neutral position when the flow forces 7 displace the elastic element 3 (with monolithically integrated conductive element 2) away from its neutral position.

The shape and form of the vibrating assembly (elastic element 3, in particular) can vary depending on application. Shapes and materials of the vibrating assembly are defined by the maximum conversion efficiency for a particular application. The materials may include metal, plastic, other organic materials or combinations of the above. The variations may include materials with different elastic properties and shapes, including tapered, elongated shapes, as well as shapes that may incorporate holes, and/or protrusions and/or depressions to enhance the oscillation characteristics while fitting the available space for vibrating movements (accommodating nearby magnetic field sources, etc.).

As mentioned, the conductive element 2 is fully or substantially perpendicular to the magnetic field orientation 8. It should be noted that there are various arrangements of the magnetic field source 6, which provides an appropriately oriented magnetic fields 8, relatively to the conductive element 2. At least one electrical conductive element 2 within the cell 1 can be made of metal rods, loops or coils attached to- or deposited on the elastic element 3 and configured to move with the elastic element 3. A multiple number of such elements can be integrated into the vibrating assembly.

In a general embodiment of the disclosure, an arbitrary number of conductive elements 2 can be included into a single cell 1. Conductive elements are arranged in proximity to corresponding magnetic field sources. A various arrangements of the electrical conductive elements 2 can be attached to the elastic elements 3 in proximity to the magnetic field sources 6, as shown in FIG. 1a and FIG. 1b.

In another embodiment of the disclosure the elastic element itself can be made of a conductive material and play a role of the conductive element by itself. In such embodiment the voltage potential is generated at the edges of the elastic element 3 itself in the presence of the magnetic field 8 that is generated by the magnetic field source 6.

The vibration of the elastic element 3 causes the conductive elements 2 to move relatively to the magnetic field sources 6. A various arrangements of the magnetic field sources can be implemented in proximity to the electrical conductive elements. The choice for the use an electrical solenoid or a permanent magnet for the magnetic field source 6 (shown in FIG. 1) depends on particular application, generator scale, power consumption rate, and cost-management considerations. The solenoid characteristics, such as material and geometry of the coils can be arranged accordingly to the optimal performance, i.e. to provide the maximum efficiency for the electro-mechanical energy conversion.

In one embodiment of the invention, a separately excited magnetic field source required a separate direct current (DC) source.

However, in preferred configuration of the disclosure, the solenoid coils possess an initial residual charge that is responsible for an initial small current within a conductive element. A certain part of this current can be directed back into the solenoid, producing a greater field, which, in turn, results in a greater current in the conductive element. Such positive feedback loop leads to the equilibrium, where the solenoid becomes a source for the constant magnetic field. Such self-excited generators that depend on residual magnetism can be classified accordingly to their fields' connection. The well-known in the art self-excited magnetic field generators include "series", "shunt", "short-shunt compound" or "long-shunt compound" types.

In other embodiments of the disclosure, the flux through the solenoid coils 6 can be enhanced by ferromagnetic cores, ferrite powder filling and/or ferrous metals coating. In addition, a permanent magnet can be implemented as an element of closed magnetic circuit to maximize the magnetic flux in the coils. There are various ferromagnetic materials that can be part if the magnetic field source, such as ceramic-based, Nd—Fe—B rare-earth, Alnico (Al—Ni—Co) magnets, and Samarium-Cobalt (Sm—Co) alloy magnets, for example.

In other embodiments of the disclosure, magnets with various poles orientation can be used, such as axial-oriented, diametrical-oriented, multi-pole oriented, etc. A plurality of magnets or coils can be positioned around the vibrating conductive element of the generating cell. Alternatively, a single magnetic field source can be implemented for plurality of generating cells.

In yet another embodiment of the invention, solenoids with different shapes and coil windings can be implemented (e.g., wave winding), including curved or contoured surface bending toward the conductive element. In general embodiment of the disclosure the magnets may assume a shape having an inward-bending or inward curving surface toward the vibration assembly. In this case, magnets may be disposed both above and lateral to the elastic element part on which the conductive element is disposed. Magnets may substantially surround the vibration assembly on which the conductive elements are disposed. The goal is twofold: to increase the efficiency by enhancing the magnetic flux at proximity of the conductive element (by crossing a greater portion of the magnetic flux), while providing the necessary room for the conductive element displacement (optimal oscillation amplitude).

In some embodiments, magnetic field sources are connected to the elastic element and move relatively to the stationary conductive elements.

It should be clearly understood that any type of magnet (permanent magnet, electromagnet, combinations of magnets and ferromagnetic material etc.), any number of magnets, and any configurations of magnets may be used in the systems described herein, in keeping with the principles of the invention.

Note, that in general embodiment of the invention, the shape of the elastic element 3 is not limited to one depicted in FIG. 1. Without departure from the principle of the invention, the vibrating assembly may include non-uniform (e.g., a tapered) shapes or structures with a non-uniform thickness. For example, the thickness of the elastic element 3 can change progressively toward its either end, providing more effective strain energy utilization.

Furthermore, variations in the shape of the elastic element 3 may be used to modify the resonant frequency of the vibrating assembly, so that it will better match the vortices frequencies in a wider range of the flow velocities. In other words, the shape of the vibrating assembly components has to provide a better mechanical impedance match with the flow-induced oscillations. In general, any other means of providing increased volume of the elastic material at regions of increased strain energy may be implemented accordingly with the principles of the invention.

The frequency of the oscillations is governed by several factors that include shape, relative geometry and mass of the vibrating assembly components, and, in substantial part, determined by the stiffness or rigidity of the elastic element 3, as displacement produces a strain in the elastic element 3. In general, the more rigid the elastic element 3, the greater the resonant frequencies of the vibrating assembly.

In the preferred embodiment of the disclosure, the set of resonant frequencies of the vibrating assembly is designed to be substantially equal to the vortex frequencies within the predetermined range of the flow velocity.

The resonant frequencies and/or amplitude of the vibrating assembly oscillations can be modified by changing the stiffness of the elastic element 3, as an example. By this mean, the efficiency of the generating cell can be predetermined and/or subsequently adjusted. In other words, it is desirable to pre-design the vibration assembly resonant frequencies or vibration amplitude in order to enhance the efficiency of conversion.

In the general embodiment of the disclosure, the displacements different from 9 (such as rotational, axial, etc.) could also be used in keeping with the principles of the disclosure.

The direction of the traveling flow 7 is fully or substantially perpendicular to the plane of the elastic element 3 for the case shown in FIG. 1a. Alternatively, the direction of the streaming flow 7 is fully or substantially parallel to the plane of the elastic element 3 for the case shown in FIG. 1b. However, as mentioned before, the elastic element 3 may be inclined at any appropriate angle relatively to the traveling flow of gas or liquid 7, in a general embodiment of the disclosure.

In the example given in FIG. 1a, the elastic element 3 may act as a well known "bluff" body of, generally, any geometry (shape and mass). Here the flow 7 impinges on the vibrating assembly that sheds vortices, producing alternating lift forces applied to the vibrating assembly. This causes the oscillations of the vibrating assembly along the direction 9.

The mentioned flow vortices impinge on the vibrating assembly (elastic element 3, in particular) at frequencies that depend, in substantial part, on the flow characteristics. In general, the higher the flow velocity, the higher the frequencies of the vortices are. As explained in more detail below, in the preferred embodiment of the disclosure, the set of vibration modes frequencies of the vibrating assembly has to be substantially equal to the possible frequencies of the vortices in the flow, so that the lift forces produced by the vortices enhance the amplitude of the vibrating assembly displacement, thus increasing the generating cell efficiency.

In the example given in FIG. 1b the generating cell does not substantially rely on a vortex shedding effect to produce vortices having frequencies related to resonant frequencies of the vibrating assembly. Instead, the vibrating assembly utilize alternating lift coefficients produced by the elastic element 3 attached to the base 4 in order to induce the displacement of the vibrating assembly. The lift coefficient produced by the vibrating assembly depends upon an angle of attack of the elastic element 3 relative to the flow 7, similarly to performance of a well known airfoil structure. The lift coefficient increases relatively rapidly as the angle of attack increases from zero. However, the lift coefficient eventually reaches a maximum value, after which a further increasing in the angle of attack reduces the lift coefficient.

Such lift reversal produced by the elastic element 3 in response to the flow 7 is used by the generating cell to produce back and forth displacements of the vibrating assembly, similar to the well-known aero-elastic 'flutter' effect. Flutter is a self-oscillation that occurs when the flow impinging on the vibrating assembly couples with its vibration mode(s), resulting in a rapid vibrating motion. When a positive feedback occurs between the resonant vibration and the aerodynamic forces, the vibration movement of the assembly further increases the flow load, which, in turn, drives the assembly to move further. The level of vibration reaches the equilibrium when the energy during the period of dynamic flow excitation is equal to the natural damping of the vibration assembly.

It should be clearly understood that the vibrating assembly is not limited to the configurations shown in FIG. 1a and FIG. 1b. Instead, any configuration of the vibrating assembly may be used in keeping with the principles of the invention. In particular, any appropriate angle of the elastic element 3 relatively to the flow direction 7 can be chosen in order to obtain the optimal efficiency of the generating cell in a particular application.

For all embodiments of the disclosure, the oscillation of the vibrating assembly is converted into electricity by the generating cell or its combinations. The generating cell is the device which is capable of converting the vibration assembly displacement into electricity. The preferred embodiment of the generating cell is disclosed, but it should be clearly understood that the principles of the invention are not limited to any particular embodiment or method of generating electricity described herein.

For all embodiments of the disclosure, the magnetic field source 6 creates a magnetic field 8 in a close proximity to the conducting element 2. The conducting element 2 oscillates within the area of the magnetic field that is created by the magnetic field source 6. The direction of the magnetic field 8 is fully or substantially perpendicular to the conducting element 2.

For all embodiments of the disclosure, the oscillations of the conductive element take place across of the transversal magnetic field created by magnetic field source. With the reference to FIG. 1*a* and FIG. 1*b*, the magnetic fields 8 are oriented in such a manner that electromotive force is generated in the conductive material of the conductive element 2. The electromotive force induces an electrical current within the conductive element 2. The value of the current depends on the various factors, such as amplitude and frequency of the oscillations, load conditions, internal resistance and impedance, etc. This fundamental arrangement of a changing magnetic flux relative to an electrical conductive material is based on the well-known Faraday Effect.

For all possible embodiments of the disclosure, the oscillations of the conductive element 2 (within the vibrating assembly) can be represented as a superposition of vibration modes (i.e. resonant harmonics) with stochastic amplitudes and phases. The criterion of generation efficiency can be defined as an average velocity of the conductive element, in the form:

$$V \sim \sum_i \overline{A}_i f_i \qquad (1)$$

where $\overline{A}_i$ and $f_i$ are the time-averaged oscillating amplitude and resonant frequency of the oscillating harmonic component i, respectively. The values of $\{\overline{A}_i\}$ depend on the interaction between the vibration assembly and the flow. In general embodiment of disclosure, the oscillating amplitudes can be of micro or macro dimensions.

Figure 2:
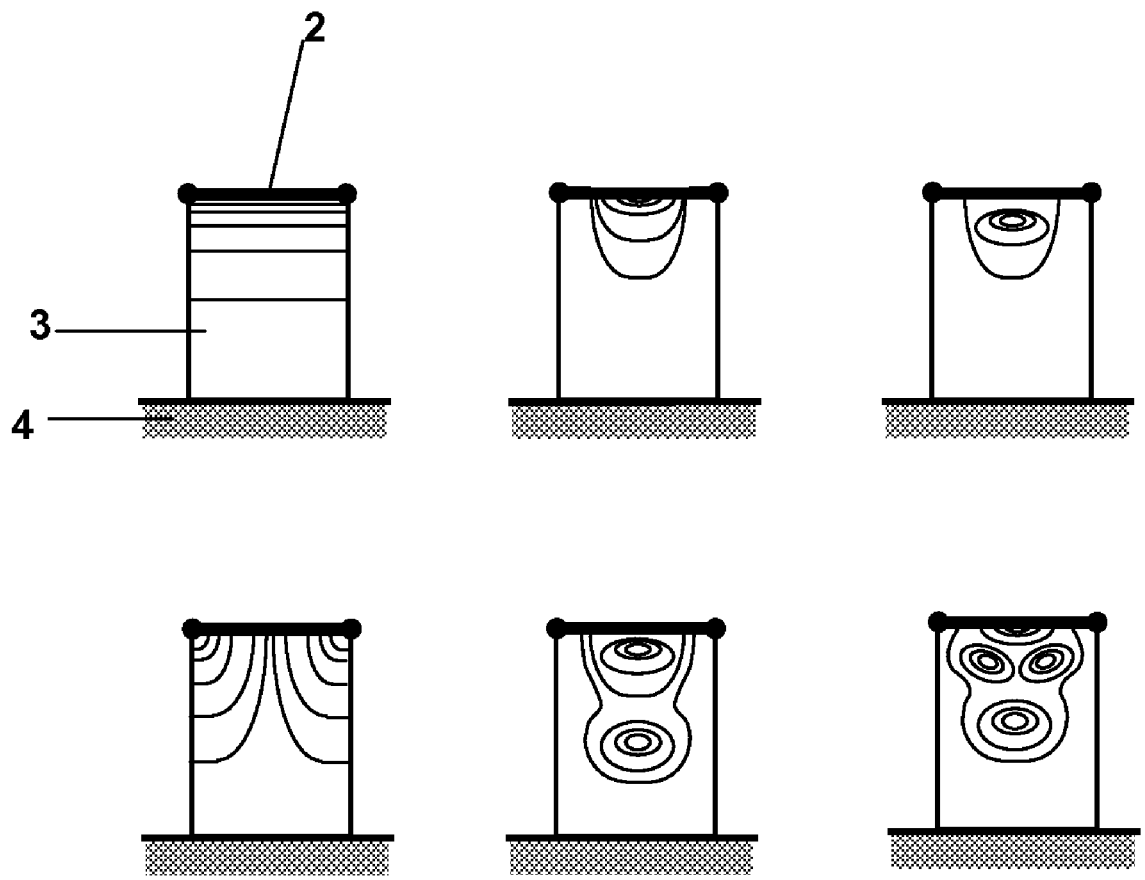
FIG. 2. Some examples of possible vibration modes of the flat elastic element (plate) in a single generating cell. Contour plots of possible mechanical deformations of oscillating elastic plate for different modes are shown.

The oscillating elastic element is designed to oscillate at various vibration modes, and not necessary at the first (fundamental) mode only. FIG. 2 illustrates contour lines for a few possible modes of vibration of the exemplary elastic element, having a shape of an elastic plate; (reference numbers in figures are hereinafter consistent with those of FIG. 1). The use of different vibrating modes of the elastic element may enable the higher efficiency factors to be achieved for particular elastic element geometries and flow characteristics. The choice of the optimal vibration modes combination is governed by a maximum energy conversion rate associated with the particular generating cell, i.e. value of V in equation (1). In a preferred embodiment of the invention, the vibrating assembly is pre-designed to support the desired normal modes of vibration.

The external flow, which is a source of the kinetic energy for the vibrating assembly, has, in general, a turbulent nature. The configuration of the vibrating assembly defined, in part, by how it is shaped towards the flow downstream, which influences the shedding frequency or flatter frequency and how the vortices impinge on the respective configurations.

The turbulent vortices of the flow impinge on the elastic element at a frequency which depends, in substantial part, on the velocity of the flow. As it is mentioned before, in preferred embodiment of the invention, the most effective energy conversion can be achieved when the resonant frequencies (at least one) of the vibration assembly is substantially equal to the characteristic frequencies of the turbulent flow. It should be noted that the turbulent flow has a continuous spectrum of turbulent frequencies. Such continuous turbulent frequency spectrum is defined by its lower and upper limits, as follows:

$$\frac{u}{l} \le f \le \frac{u}{l} \text{Re}^{3/4} \qquad (2)$$

where u is the flow velocity, l is the characteristic length and Re is the Reynolds number. The energy distribution in such spectrum is given by:

$$E(f) \sim k f^{-5/3} \qquad (3)$$

where k is the coefficient dependent on the flow configuration and velocity.

It can be seen from the equation (3) that the energy of turbulent vortices decreases when their respective frequencies increase. At the same time, it should be understood that the portion of the flow energy, which is converted into the vibration assembly oscillations, in certain cases, may reach its maximum value at higher resonant frequencies (e.g. vibration assembly second or third vibration mode), instead of the first (fundamental) one. In these cases, the higher terms (second or higher) in the equation (1) will prevail.

Yet in other embodiment of the disclosure, the oscillations of the elastic element can be controlled or adjusted accordingly to the flow characteristics, environmental condition or desired output of the generating cell(s). This can be implemented by controlling the oscillating frequencies of the vibration assembly. This adjustment may involve a mechanical tuning of the vibrating assembly itself or tuning the velocity of the flow impinging on the vibrating assembly.

Specifically, in one embodiment of the invention, the flow-controlling structures (i.e. shaping and/or deflecting elements) can be positioned in the flow upstream or downstream proximity of the cell's vibrating assembly, as shown in FIG. 3*a*. Specifically, by using such flow-aiming or flow-deflecting elements 10, the velocity of the flow, impinging on the vibrating assembly, can be is increased or decreased. Moreover, the deflectors 10 can cause the flow to impinge on the vibrating assembly at (generally different) angles 11 (angle of attack) between the flow 7 and surface of the elastic element 3. This angular impingement of the flow 7 on the vibrating assembly within the cell 1 may enhance or, alternatively, damp down the vibration of the single vibration assembly or its combination.

The FIG. 3*b* illustrates the principle of the multiple flow-controlling or flow-enhancing structures 10 that may be implemented in combination with various arrangements of the generating cells 1. The flow-enhancing structures may adjust the exposure of the vibrating assemblies to the flow 7, for example, by increasing the velocity of the flow impinging on the vibrating assemblies' upstream and/or downstream surfaces. The flow-enhancing structures may include multiple inclined surfaces, relatively to the flow stream direction 7. It can provide a gradual transition for the flow in proximity to the vibrating assemblies, thereby reducing flow turbulence and increasing the flow velocity, as an example.

The flow-controlling/flow-enhancing structures 10 may be used to optimize the dynamics of the flow-stream impinging on the vibrating assembly within the cell 1, without departing from the principles of the invention. These structures 10 may include tapers, flow diverters, spoilers, or elements that laterally offset from a flow passage and may have different shapes, including tapered, elongated shapes, may incorporate holes and/or protrusions. The values of angles 11 and geometry of the flow-enhancing structures 10 have to be chosen based on the best conversion efficiency for a particular number of generating cells and its application.

Figure 3:
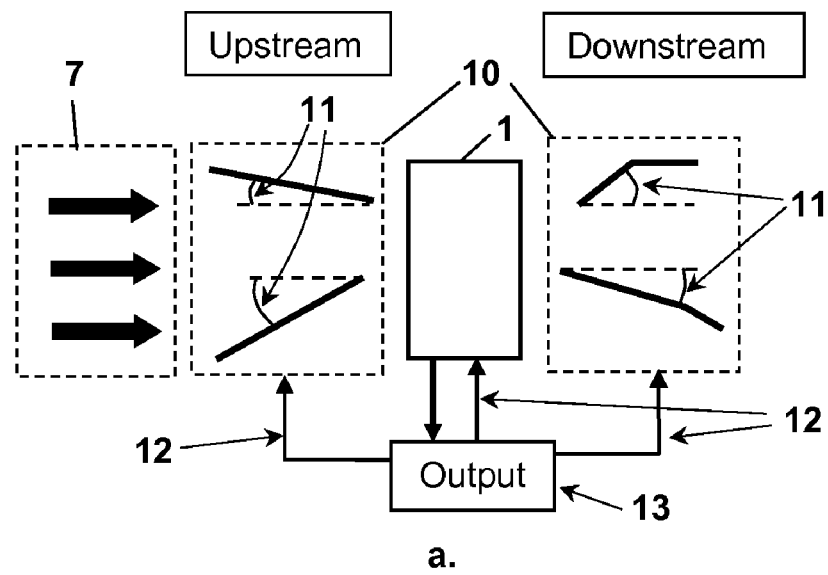
FIG. 3(a-b). Some examples of possible flow-shaping downstream and upstream structures for adjusting the efficiency of the generating cells. General case for a single cell—(a) and combination of cells—(b).
Figure 3:
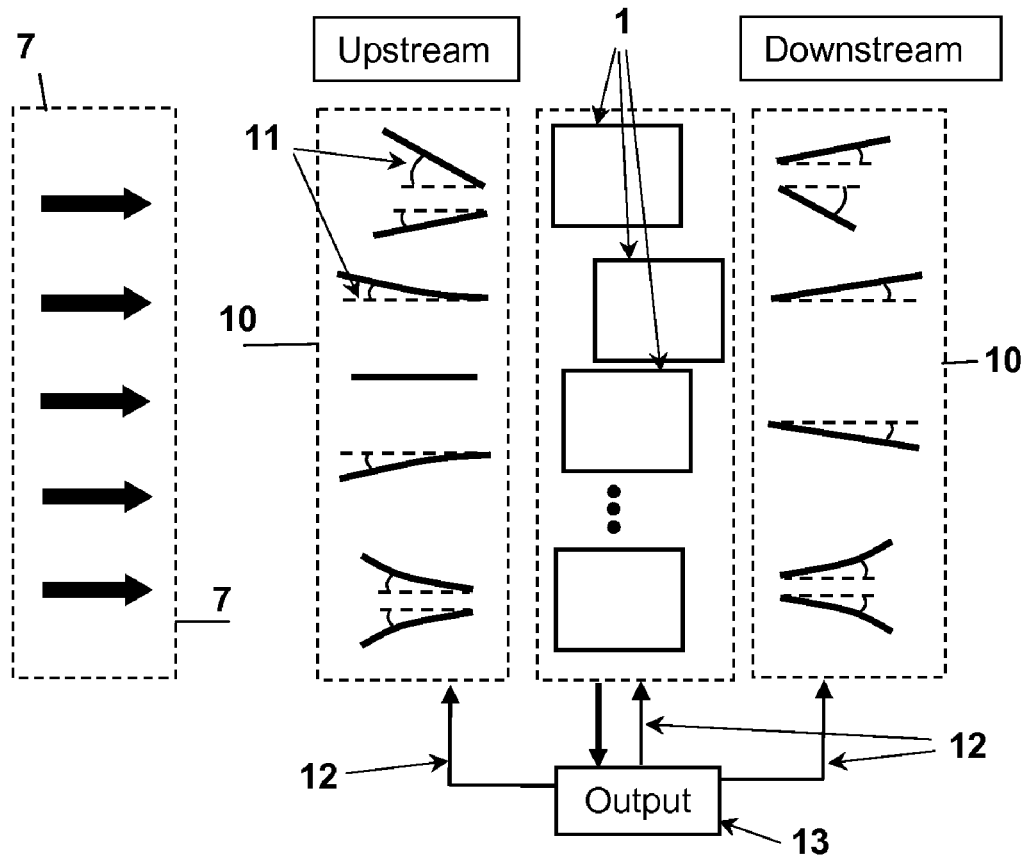

In another embodiment of the disclosure, the flow-controlling structure, having an angle of attack 11, may be part of the initially installed embodiment of the disclosure or, optionally, can be adjusted during a real-time operation of the disclosure by using a feedback control loop 12, as illustrated in FIG. 3.

In keeping with the principles of the invention, any feedback methods 12 can be implemented to control either the vibrating assemblies themselves or the flow-controlling (upstream and/or downstream) structures 10. For example, the angles 11 of the shaping structures 10 can be controlled by using the feedback control loop 12, based on the generating cell(s) output characteristics 13, see FIG. 3a and FIG. 3b.

Figure 4:
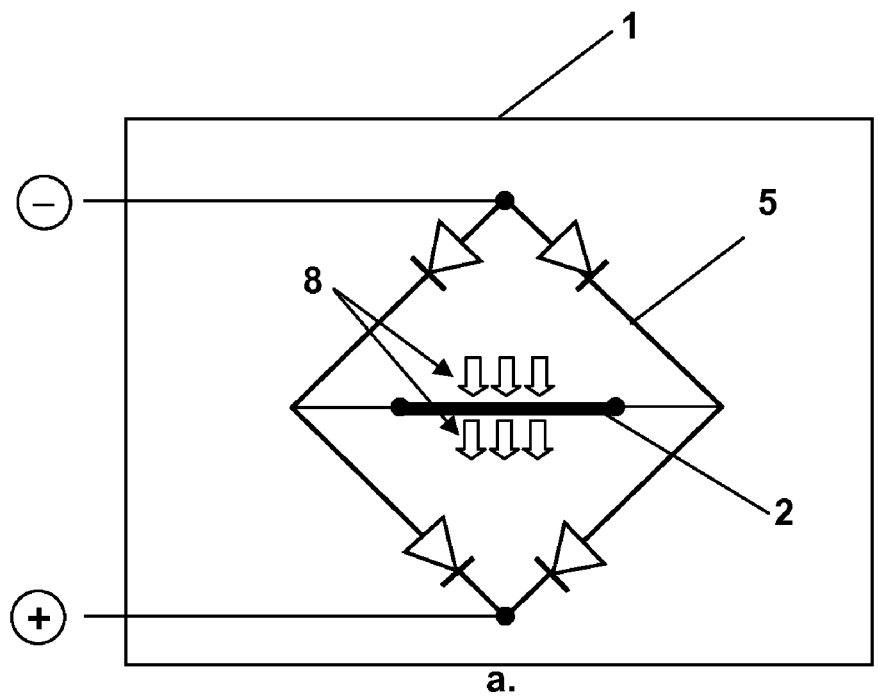
FIG. 4(a-c). The principle of direct current generation by a single oscillating cell with a full-wave rectification. The oscillations direction is perpendicular to the plane of the drawing: towards the viewer—(b) and from the viewer—(c).
Figure 4:
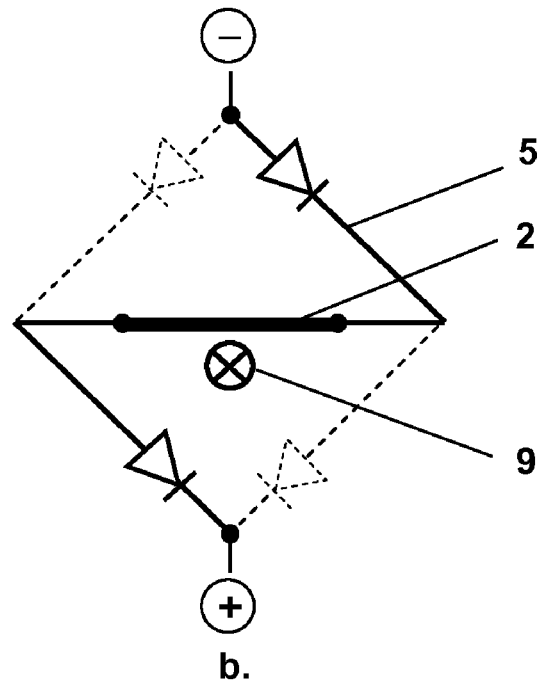
Figure 4:
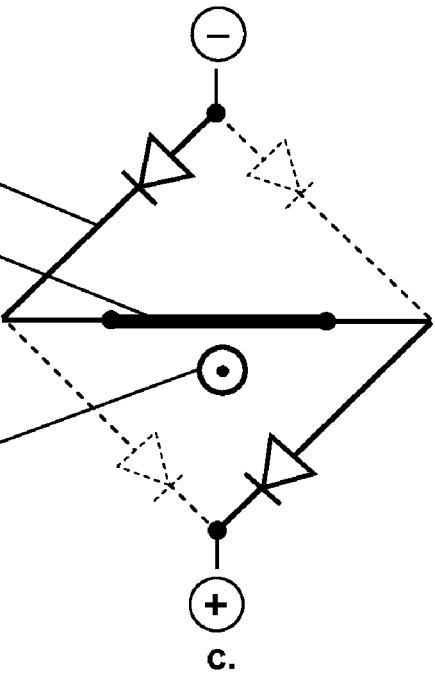

In preferred generating cell configuration shown in FIG. 4, an electrical circuit 5 is provided to rectify and extract the generated electrical current. It is important that the connection of the cell within the disclosed device provides a DC (and single-polarity electromotive force) regardless of the conductive element's displacement direction 9. For this purpose, the rectifying part of the circuit 5 is used.

FIG. 4 schematically illustrates the electrical circuit configured to rectify the induced electrical current. The rectifying circuit 5 converts an AC received from the conductive element into a DC. The DC can further be directed into a step-up transformer or a power converter, depending on the voltage levels required by a particular application.

FIG. 4 illustrates the preferable generating cell configuration 1, implementing a full-wave rectification electrical circuit 5. In this case, the current is generated within a full length of the conductive element 2, regardless of its oscillation direction 9, as explained by FIG. 4b and FIG. 4c for the conductive element displacement from the viewer and towards the viewer, respectively. Depending on the oscillation direction 9 (i.e. conductive element displacement direction), the generated electrical current utilizes different segments of the electrical circuit 5, see respective cases in FIG. 4b and FIG. 4c, excluding the dashed segments.

In a full-wave rectification circuit an AC-generated electromotive force may be a subject to a voltage double using smoothing capacitors. The rectification circuits may also include a step-up transformer, power storage devices, such as a rechargeable battery or a super-capacitor. Supply and demand of the energy in a particular application can be managed by a buffer, such as a power storage device. The smoothing capacitors may provide a portion of the accumulated voltage to a high impedance circuit. By these means, the disclosed generator can work without any external power supply, making use of vibration to provide an electric power according to the necessity.

Figure 5:
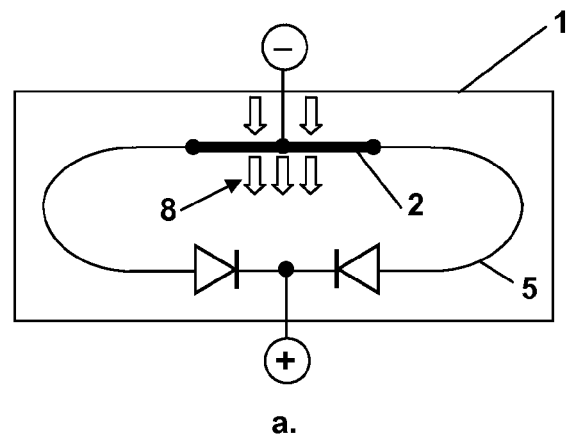
FIG. 5(a-c). The principle of direct current generation by a single oscillating cell with simplified rectification. The oscillations direction is perpendicular to the plane of the drawing: towards the viewer—(b) and from the viewer—(c).
Figure 5:
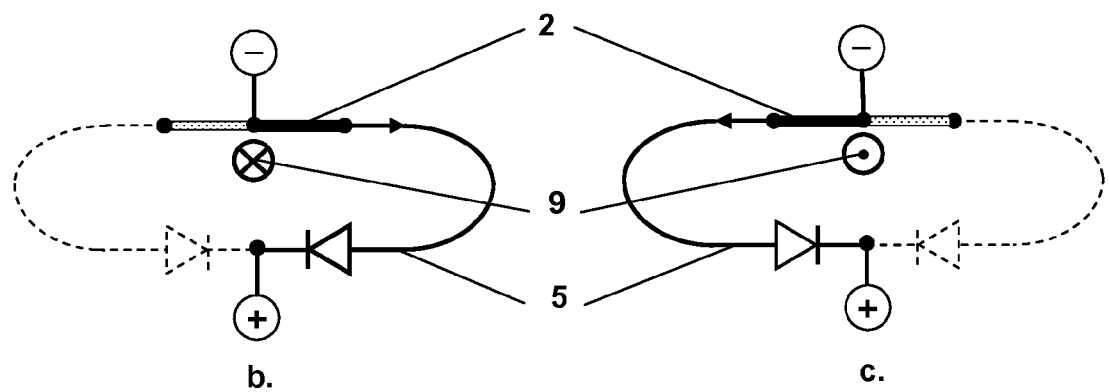

In another embodiment of the disclosure, a simplified rectification circuit can be used, as shown in FIG. 5. Depending on the oscillation direction 9 (i.e. conductive element displacement direction), the generated electrical current utilizes different segments of the electrical circuit 5, see respective cases in FIG. 5b and FIG. 5c, for the conductive element displacement from the viewer and towards the viewer, respectively. In comparison to the case shown in FIG. 4, in this case only half of the conductive element is taking part in the electrical current generation, at the benefit of the simplified rectification circuit.

As it was described, during the generating cell operation, a generated AC within conductive element is further rectified and can be stored. In the preferred embodiment of the disclosure, a required magnetic field is produced by electromagnetic induction, preferably by directing a certain part of electricity, produced by the generating cell(s), back into solenoids. This enables a self-sustained operation of the generating cell(s), without any external power-supply unit.

In another embodiment of the invention, an arbitrary number of the generating cells can be combined into a single circuit, in order to increase the generator total power output. Such combination of cells can be arranged in a scalable generating panels (the 'wind-panels', as an example) with customized cross-section areas to harvest a maximum energy from the available flow. The resulting power-scale of the generator depends on the total number and individual characteristics of the generating cells in such combination.

Figure 6:
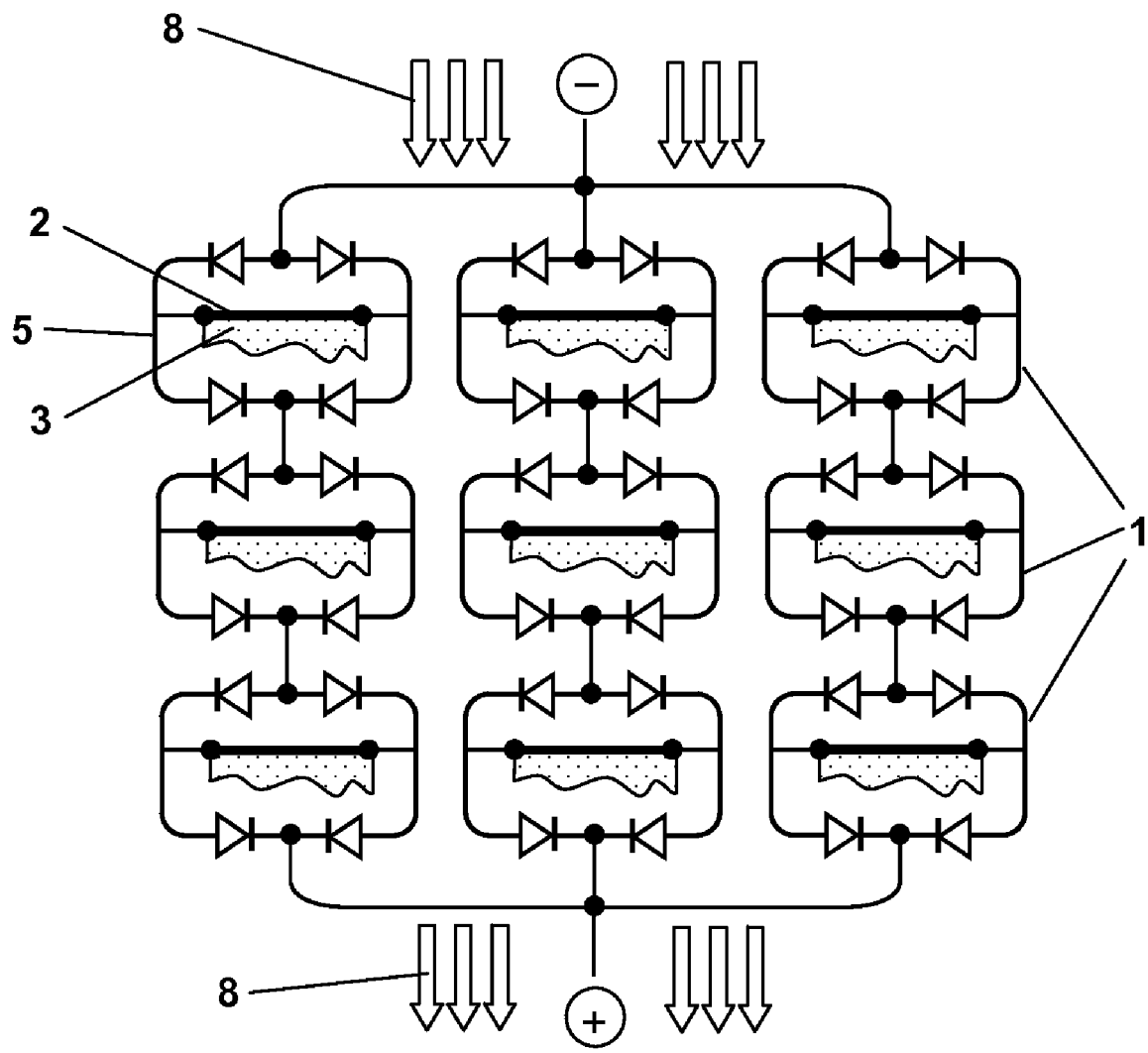
FIG. 6. The example of, generally, arbitrary number of generating cells connected either in-series and/or in-parallel.

The generating cells within the electronic circuit can be connected in-series and/or in-parallel. FIG. 6 illustrates a possible example of cells combined into the generating panel, including in-series and/or in-parallel connections. The connection type and the number of joined cells depends on electrical requirements (application), as well as on the amount of power dedicated to be fed back into the generator circuit. A circuit that implements a series connection can be used, for example, to achieve higher voltages under lower flow velocities.

Figure 7:
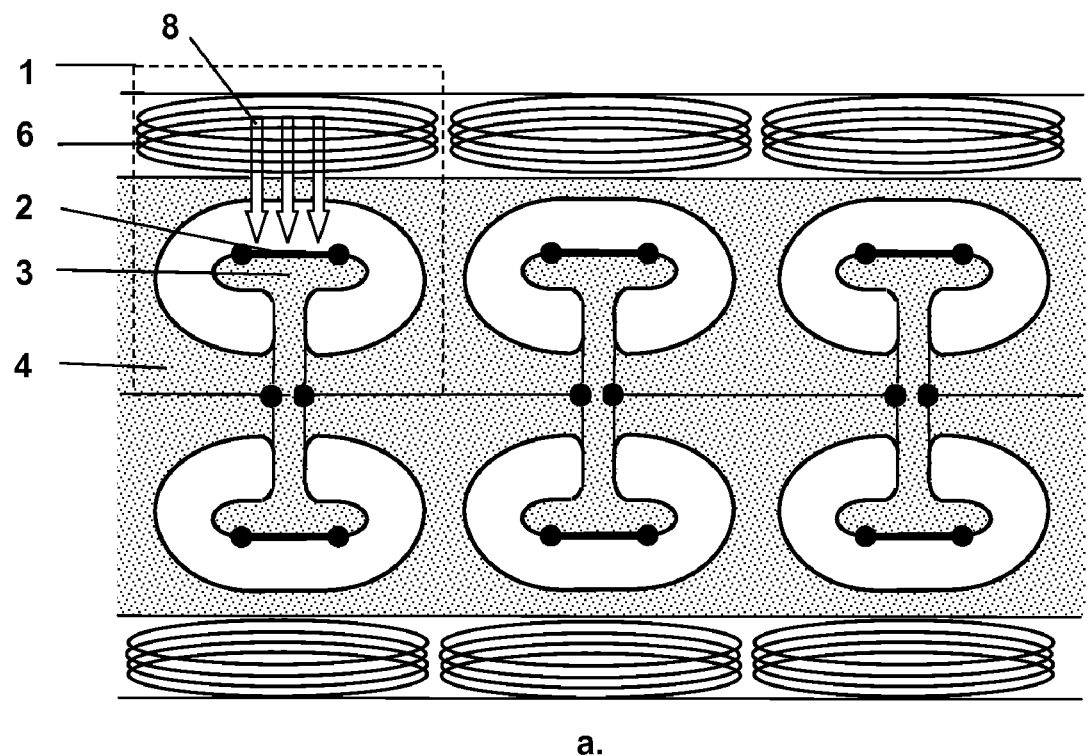
FIG. 7(a-b). The examples of MEMS layouts for generating panels. Multiple generating cells share a common base (wafer). The batch fabrication or micromachining technology can be used for micro-fabricated layouts.
Figure 7:
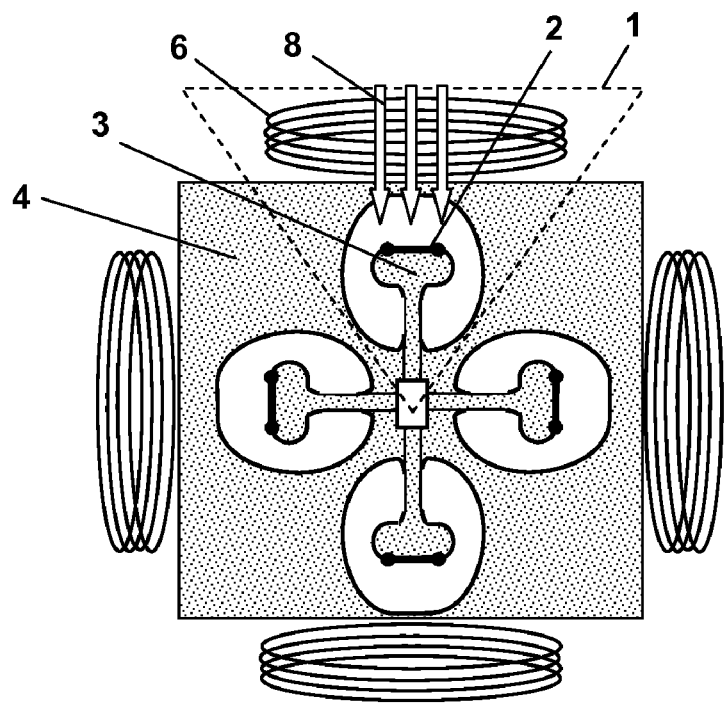

One or all parts of the circuit that combines multiple generating cells can be manufactured using a MEMS (Micro Electro-Mechanical System) technology. The relatively simple shape of the vibrating elements enables a cost-effective manufacturing and reproduction with high precision. Such integrated generating micro cells are capable of shedding flow vortices under wide range of flow conditions, in particular, at relatively low flow velocities. FIG. 7a and FIG. 7b illustrate the MEMS device layout example, which incorporates multiple vibrating assemblies and can be micro-fabricated using a batch fabrication or micromachining.

In another embodiment of the invention, the rectifying circuitry and magnetic field sources can also be monolithically integrated into the same base of the generating cell(s) within MEMS or similar device.

The batch fabrication processes was originally developed for the integrated circuit technology, printed electronics and RF identification tag antennas. It enables simultaneous processing of hundreds of generating cells on a single wafer (base). Since the cost for processing the MEMS wafer virtually independent on the number of elements on it, the batch fabrication is an economical way to make a large number of devices. The batch fabrication is a radical departure from the traditional series manufacturing, and is well-suited for making relatively simple mechanical components for disclosed generating panels. The batch fabrication process, specifically the use of photolithography, allows the defining of any shape on the surface of the base.

To create 3-dimensional configurations for generating cells combination, a surface micromachining or bulk micromachining can be involved. A surface micromachining is based on a thin-films patterning on a top of a substrate wafer. Unlike surface micromachining, the bulk micromachining defines structures by selective etching of the substrate.

It should be clearly understood that various embodiments of the generating cell described herein may be realized using MEMS technology in various components orientations, such as inclined, inverted, horizontal, vertical, etc., and in various configurations, without departing from the principles of the present invention.

Figure 8:
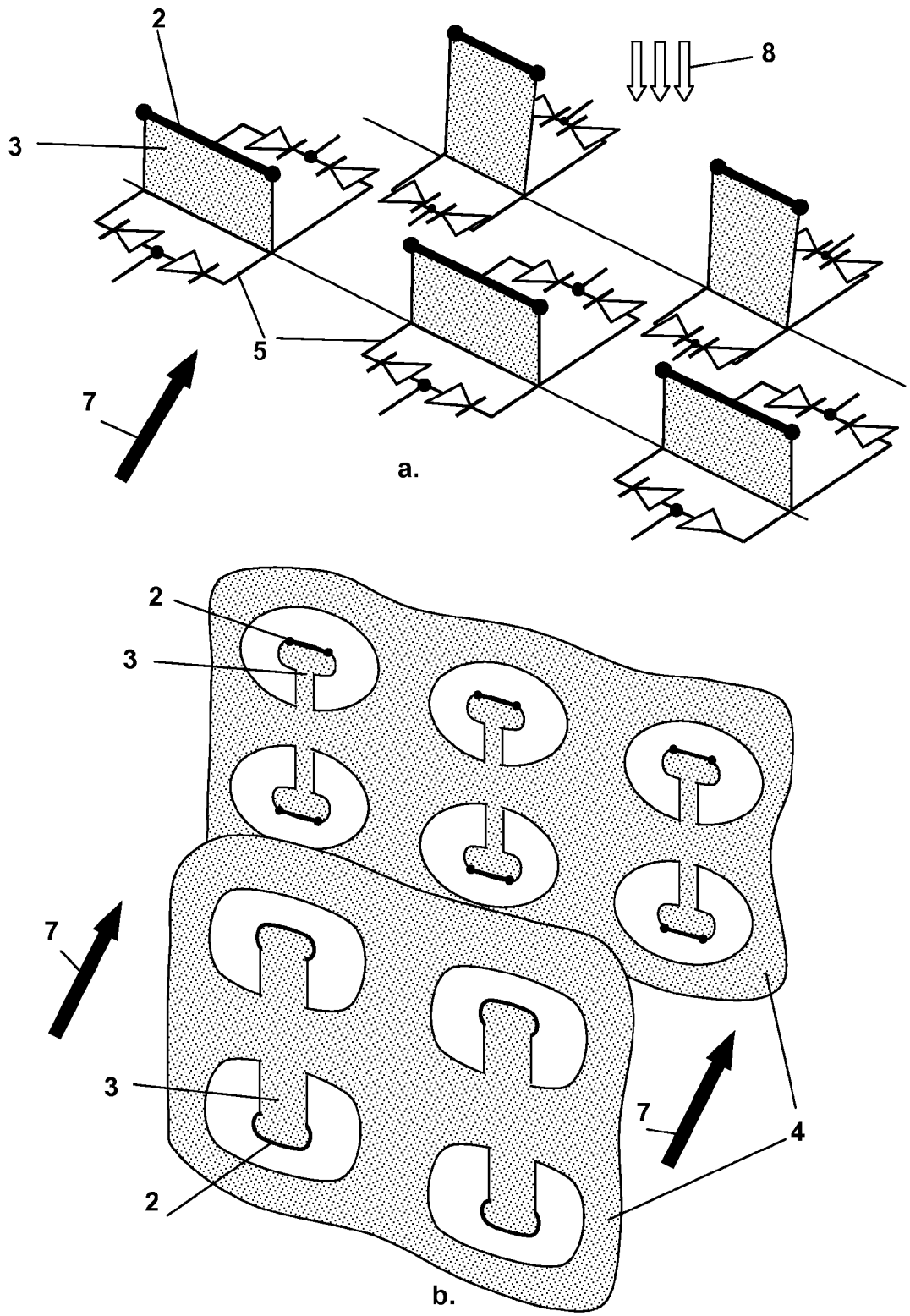
FIG. 8(a-b). The examples of a 3-dimensional arrangement of generally different generating cells. Various generating cells and its combination can be located at different parts of the flow.

According to another embodiment of the invention, the exemplary generating panel may include more than one layer of (generally different) generating cells. This can benefit the total generator output by harvesting energy flow at different locations of the stream (i.e. flow cross-sections), using the generating panels (cells combinations) that are adapted to the local flow characteristics. Since, in general, each generating cell (or its combination) impedes on the flow differently, the total generator efficiency can be maximized by placing various (locally optimized) generating cells at different locations within the flow-stream, both laterally and along the flow-stream. FIG. 8 illustrates the examples of such 3-dimensional arrangement of various generating cells, or its combinations (generating panels), as shown in FIG. 8*a* and FIG. 8*b*, respectively.

The disclosure addresses energy supply challenges in a variety of applications, including large-scale power supplies, medium size independent energy sources, as well as energy harvesting for small sensors and sensor arrays. The efficiency of the proposed device can be optimized for different structural scales; it can furnish the wide range of different flows and flow characteristics, such as flow cross-section, speed, direction, temperature, humidity, etc.

The disclosed arrays of generating cells can become a crucial contribution to 'smart building' or 'green building' concepts. For example, hundreds or thousands of small generating cells, implemented as roof panels, can become a virtually maintenance-free source of electrical power, making it a much better alternative to expensive solar panels.

In another embodiment of the invention a small-scale combination of disclosed generating cells can be installed along the HVAC ducting network within the buildings, providing power supply to various wireless sensors or LED-based lighting. It can also be adopted for the flow-energy harvesting within the water- or oil-pipes, thus providing a continuous power supply to hard-to-reach areas, as an example. Accordingly, the overall reliance on batteries can be reduced expanding the installation outreach of various remote or distributed long-life sensor arrays.

In yet another embodiment, the invention can also be used in powering cell phones as well as remote telecommunication nodes or wireless data transmission network nodes, such as WiFi, or meshed network.

In yet another embodiment, the invention may be used in flying devices and vehicles, such as light planes, for example. The draughts and airflows present at higher altitudes can be captured by a generator disclosed herein to power systems of the flying device directly or via battery or capacitor. The same is applicable for submarine vessels and underwater currents.

In yet another embodiment of the invention, the generating cell combinations themselves may perform as both a flow sensor and the power source needed for transmitting that sensor information, if the signal produced at different flow speeds are pre-calibrated for a specific design.

In yet another embodiment, the invention can be used for a rural lighting, especially in emerging economies. For example, more than 40% of people in India are hooked up to a power grid and endure daily power failures. Globally, the kerosene and similar fuels contribute 20% of lighting expenses while supply only 0.1% of lighting energy services. According to UNEP, a single wick of kerosene can burn up to 80 liters of fuel, emitting more than 250 kilograms of carbon dioxide per year. In developing countries, the use of kerosene and other "dirty" fossil fuels for indoor lighting is responsible for 64% of deaths and 81% of lifelong disabilities from indoor pollution for children under the age of five. New wind generators, based on disclosed combination of generating cells, can be used for simple lighting systems at scales of a few watts or more in combination with highly efficient LEDs. Such systems can provide clean, cheap lighting over a very long time.

Unlike the previously reported power generators, the disclosure is capable to operate under wide range of the flow condition. Thus, the proposed generator is capable to operate at flow speeds that are too small for the most available wind and liquid flow generators. At the same time, the disclosure is also responsive to very high flow velocities, without any additional mechanism required to avoid a catastrophic damage under the high flow conditions. Moreover, the disclosure does not include any massive elements which can be dangerous when detached if the device fails under extreme conditions, compare to existing generators. The disclosure does not require any rotating, friction, grinding parts or flexible membranes to provide a quiet, virtually maintenance-free, operation. The efficiency of the proposed device has no turbine-related Betz-law limitation and potentially more efficient than devices implementing piezoelectric transducers.

It is to be clearly understood that the wide variety of various tools and different types of devices may be powered by the generator disclosed herein. For example, any of the electrical power generating cells described herein may include any of the magnetic field sources, vibrating assemblies, lift reversal elastic elements or vortex shedding elastic elements described herein, or any combination these elements manufactured individually or in bulk. Accordingly, the foregoing detailed description is to be clearly understood as being given by way of example only without limiting the scope of the invention.

The invention has been described with reference to specific embodiments thereof. It will, however, be evident that various modifications and changes may be made thereto without departing from the broader scope of the disclosure. As will be realized by one skilled in the art, the present disclosure is capable of other and different embodiments, and its details are capable of modifications in various obvious respects, all without departing from the disclosure. Accordingly, the drawings and description are to be regarded as illustrative in an illustrative rather than a restrictive sense.

The invention claimed is:

1. A device for generating electrical power from a flow, said device comprising:
    a vibrating assembly for placing in a flow, said vibrating assembly comprising an electrical conductive element, and
    at least one elastic element having one end fixed to a base and another end is in free motion caused by the flow, wherein said electrical conductive element is integrated with said at least one elastic element; and
    a magnetic field source configured to apply a magnetic field to said electrical conductive element and to induce an electrical current in said electrical conductive element; the conductive element being substantially perpendicular to the magnetic field direction;
    wherein said vibrating assembly is configured to oscillate in response to said flow, causing displacements of said electrical conductive element relatively to the direction of said magnetic field, and to output said electrical current resulting from said displacements.

2. The device of claim 1, wherein the magnetic field source is located separately from vibrating assembly.

3. The device of claim 1, wherein at least one vibration mode of said vibrating assembly substantially equals to a vortex frequency in the flow.

4. The device of claim 3, wherein said flow is a gas flow.

5. The device of claim 4, wherein the magnetic field source is an electrical solenoid.

6. The device of claim 3, wherein said flow is a liquid flow.

7. The device of claim 1, wherein a set of vibrating modes includes rotational vibrations.

8. The device of claim 1, further comprising an electrical circuit extracting said electrical current, said electrical circuit comprising rectifying means and optionally capacitors, batteries or power converters.

9. The device of claim 1, wherein said at least one elastic element comprises a conductive material.

10. The device of to claim 1, wherein said at least one elastic element comprises a dielectric material.

11. The device of to claim 1, wherein said at least one elastic element having a plane and said flow having a direction, said elastic element plane and said flow direction being substantially perpendicular.

12. The device according to claim 1, wherein said at least one elastic element having a plane and said flow having a direction, a direction of said free end of the elastic element and said flow direction being substantially parallel.

13. The device according to claim 1, further comprising a flow-controlling element for adjusting the velocity of said flow and the direction of said flow in proximity of said vibrating assembly in order to achieve improved efficiency of the electricity generation.

14. The device according to claim 13, wherein said displacements of said electrical conductive element are adjustable by controlling said vibrating assembly or said flow-controlling element.

15. An electrical power generating system, said system comprising:
   at least two electricity generating devices combined into a single electrical circuit, each device comprising:
   a vibrating assembly for placing in a flow, said vibrating assembly comprising an electrical conductive element having a longitudinal axis, and at least one elastic element having one end fixed to a base and another end is in free motion caused by the flow, wherein said electrical conductive element is integrated with said at least one elastic element; and a magnetic field source configured to apply a magnetic field to said electrical conductive element and to induce an electrical current in said electrical conductive element; the conductive element being substantially perpendicular to the magnetic field direction; wherein said vibrating assembly is configured to oscillate in response to said flow, causing displacements of said electrical conductive element relatively to the direction of said magnetic field, and to output said electrical current resulting from said displacements, wherein the output of two electricity generating devices are combined together to produce aggregated output of the electrical power generating system.

16. The system of claim 15, wherein the circuit includes electricity generating devices connected either in-series or in-parallel.

17. The system of claim 15, wherein said at least two devices have identical size and physical parameters.

18. A method for generating electricity, said method comprising:
   placing a vibrating assembly in a flow, wherein said vibrating assembly is performing oscillations caused by said flow, said vibrating assembly comprising an electrical conductive element, and at least one elastic element having one end fixed to a base, wherein said electrical conductive element is integrated with said at least one elastic element; and applying a magnetic field to said electrical conductive element, generating an electrical current in said electrical conductive element; the conductive element being substantially perpendicular to the magnetic field direction; wherein said magnetic field induces an electrical current in said electrical conductive element, and the vibrating assembly outputs a produced electric power.

19. The method of claim 18, further comprising placing a source of said magnetic field in proximity to said electrical conductive element, but not being incorporated in the vibrating assembly.

20. A method of claim 18, wherein said flow is a flow in confined flow passages in pipes or ducts.

* * * * *